United States Patent
Steinke et al.

(10) Patent No.: US 11,284,552 B2
(45) Date of Patent: Mar. 29, 2022

(54) ROW UNIT FOR SELECTIVELY DISPENSING A PLURALITY OF AGRICULTURAL PRODUCTS AND ASSOCIATED AGRICULTURAL IMPLEMENTS

(71) Applicant: CNH Industrial America LLC, New Holland, PA (US)

(72) Inventors: Anthony W. Steinke, Rensselaer, IN (US); Trevor Stanhope, Palos Hills, IL (US); Darian Landolt, Evanston, IL (US)

(73) Assignee: CNH Industrial America LLC, New Holland, PA (US)

( * ) Notice: Subject to any disclaimer, the term of this patent is extended or adjusted under 35 U.S.C. 154(b) by 262 days.

(21) Appl. No.: 16/448,211

(22) Filed: Jun. 21, 2019

(65) Prior Publication Data
US 2020/0396888 A1    Dec. 24, 2020

(51) Int. Cl.
*A01B 49/06* (2006.01)
*A01C 5/06* (2006.01)
(Continued)

(52) U.S. Cl.
CPC .............. *A01B 49/06* (2013.01); *A01C 5/064* (2013.01); *A01C 5/068* (2013.01); *A01C 7/06* (2013.01); *A01C 7/20* (2013.01)

(58) Field of Classification Search
CPC ......... A01B 49/06; A01B 49/04; A01B 49/00; A01C 5/064; A01C 5/068; A01C 7/06;
(Continued)

(56) References Cited

U.S. PATENT DOCUMENTS

| 4,608,933 A | 9/1986 | Wyrill, III |
| 5,303,662 A | 4/1994 | Drake |

(Continued)

FOREIGN PATENT DOCUMENTS

EP    0132521 A1    2/1985

OTHER PUBLICATIONS

Kinze Row Crop Planters, Kinze Manufacturing, Inc., Williamsburg, Iowa, Jan. 15, 2018, 36 pages.
(Continued)

*Primary Examiner* — Christopher J. Novosad
(74) *Attorney, Agent, or Firm* — Rebecca L. Henkel; Rickard K. DeMille

(57) ABSTRACT

In one aspect, a row unit for use on an agricultural implement may include a furrow-forming tool coupled to a frame. The furrow-forming tool may be configured to form a furrow in soil present within the field as the row unit is moved across the field. The row unit may also include a first dispensing device configured to dispense a first agricultural product into the furrow. Furthermore, the row unit may include a cultivator coupled to the frame and positioned aft of the furrow-forming tool relative to a direction of travel of the row unit. The cultivator may, in turn, be configured to agitate a lateral swath of the soil. Additionally, the row unit may include a second dispensing device positioned aft of the first dispensing device relative to the direction of travel, with the second dispensing device configured to dispense a second agricultural product into the field.

13 Claims, 3 Drawing Sheets

(51) Int. Cl.
*A01C 7/06* (2006.01)
*A01C 7/20* (2006.01)

(58) Field of Classification Search
CPC .. A01C 7/20; A01C 5/062; A01C 5/06; A01C 5/00; A01C 7/00
See application file for complete search history.

(56) References Cited

U.S. PATENT DOCUMENTS

| | | |
|---|---|---|
| 8,061,282 B2 | 11/2011 | Borland |
| 9,307,690 B2 | 4/2016 | Bassett |
| 9,420,739 B2 | 8/2016 | Rollenhagen |
| 9,456,539 B2 | 10/2016 | Roth et al. |
| 9,615,497 B2 | 4/2017 | Bassett |
| 9,743,571 B2 | 8/2017 | Dames |
| 9,877,425 B2 | 1/2018 | Garner et al. |
| 10,149,428 B2 | 12/2018 | Wendte et al. |
| 10,194,572 B2 | 2/2019 | Roberge et al. |
| 2003/0084829 A1* | 5/2003 | Lempriere ............. A01C 5/062 111/50 |
| 2017/0311538 A1* | 11/2017 | Wendte .................. A01C 7/123 |
| 2018/0092291 A1 | 4/2018 | Duman et al. |
| 2018/0359910 A1 | 12/2018 | Schoeny et al. |

OTHER PUBLICATIONS

Perkins Catalog, Perkins Sales Inc., Bernie, MO., 2018, 92 Pages.

\* cited by examiner

ROW UNIT FOR SELECTIVELY DISPENSING A PLURALITY OF AGRICULTURAL PRODUCTS AND ASSOCIATED AGRICULTURAL IMPLEMENTS

FIELD OF THE INVENTION

The present disclosure generally relates to row units and, more particularly, to a row unit for selectively planting a plurality of agricultural products (e.g., cash crop seeds and cover crop seeds) in a field and associated agricultural implements.

BACKGROUND OF THE INVENTION

In recent years, the use of cover crops in farming practices has grown dramatically. Cover crops, such as grasses, brassicas, and legumes, are generally used to manage erosion and improve nutrient retention in the soil of a field during the winter months between the harvest and subsequent planting of a cash crop (e.g., corn, soy beans, and/or the like). As such, cover crops must generally emerge from the soil shortly after the cash crop is harvested to maximize their effectiveness. To facilitate the timing of such emergence, cover crops are generally planted in the field shortly after the emergence of the cash crops. For example, in certain instances, cover crops may planted in between the rows of the post-emergent cash crop using direct or incorporated seeding methods in a process known as "interseeding." However, interseeding the cover crop generally requires a specialized piece of equipment, namely an interseeder, which adds to the overall cost of cover cropping practices.

Accordingly, an improved row unit for an agricultural implement would be welcomed in the technology. In particular, a row unit that may be configured to differing agricultural products would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a row unit for use on an agricultural implement. The row unit may include a frame and a furrow-forming tool coupled to the frame. The furrow-forming tool may be configured to form a furrow in soil present within the field as the row unit is moved across the field. The row unit may also include a first dispensing device configured to dispense a first agricultural product into the furrow. Furthermore, the row unit may include a cultivator coupled to the frame and positioned aft of the furrow-forming tool relative to a direction of travel of the row unit. The cultivator may, in turn, be configured to agitate a lateral swath of the soil. Additionally, the row unit may include a second dispensing device positioned aft of the first dispensing device relative to the direction of travel, with the second dispensing device configured to dispense a second agricultural product into the field.

In another aspect, the present subject matter is directed to an agricultural implement. The agricultural implement may include a toolbar extending in a lateral direction between a first side and a second side. The agricultural implement may also include a plurality of row units mounted on the toolbar, with the plurality of row units being spaced apart from each other row unit in the lateral direction. A first row unit of the plurality of row units may include a frame and a furrow-forming tool coupled to the frame. The furrow-forming tool may, in turn, be configured to form a furrow in soil present within the field as the agricultural implement is moved across the field. The first row unit may include a first dispensing device configured to dispense a first agricultural product into the furrow. Furthermore, the first row unit may include a cultivator coupled to the frame and positioned aft of the furrow-forming tool relative to a direction of travel of the agricultural implement, with the cultivator configured to agitate a lateral swath of the soil. Additionally, the first row unit may include a second dispensing device positioned aft of the first dispensing device relative to the direction of travel, with the second dispensing device configured to dispense a second agricultural product into the field.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
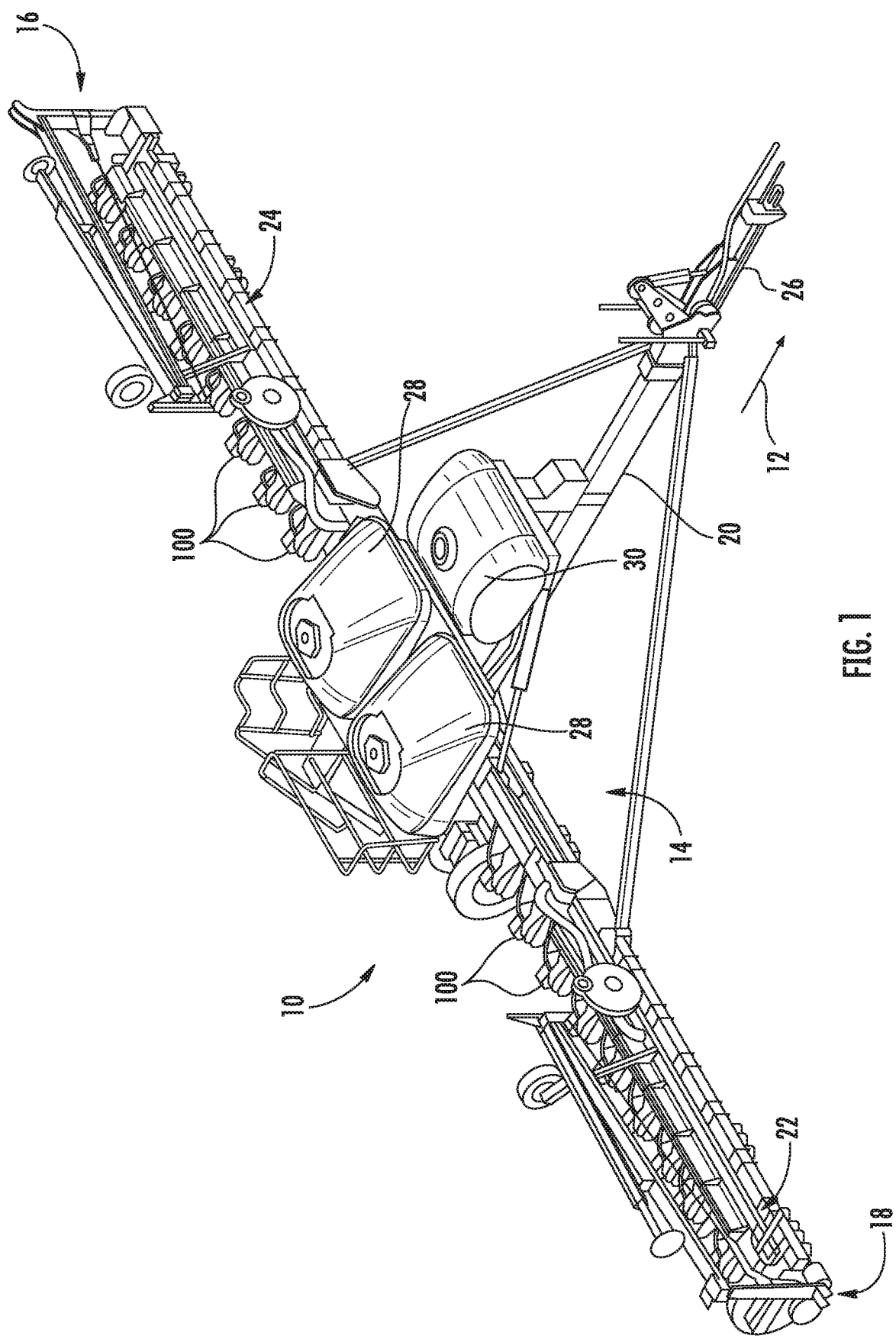
FIG. 1 illustrates a top view of one embodiment of an agricultural implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to row units for selectively dispensing differing agricultural products (e.g., cash crop seeds and cover crop seeds) in a field and associated agricultural implements. Specifically, in several embodiments, the row unit may include a frame and a furrow-forming tool (e.g., a disc opener) coupled to the frame. The furrow-forming tool may, in turn, be configured to form a furrow in soil present within the field as the row unit is moved across the field. Furthermore, the row unit may include a first dispensing device (e.g., a seed tube) configured to dispense a first agricultural product (e.g., primary or cash crop seeds) into the furrow. Additionally, the row unit may include a furrow-closing assembly that is removably coupled to the frame. The furrow-closing assembly may, in turn, include one or more tools (e.g., a closing disc(s)/wheel(s)) that are configured to collapse or otherwise close the furrow after the first agricultural product has been deposited therein.

In accordance with aspects of the present subject matter, the furrow-closing assembly may be removed from the row unit and a cover crop seeding assembly may be removably coupled to the frame of the row unit in its place. Specifically, in several embodiments, the cover crop seeding assembly may include a cultivator positioned aft of the furrow-forming tool. The cultivator may, in turn, be configured to agitate a lateral swath of the soil as the row unit is moved across the field. For example, in one embodiment, the cultivator may include a plurality of circumferentially-arranged ground-engaging tines or fingers configured to agitate the soil. Furthermore, the cover crop seeding assembly may include a tank configured to store a second agricultural product (e.g., cover crop seeds) and a second seed-dispensing device configured to meter and dispense the second agricultural product into the field.

Additionally, in several embodiments, the second dispensing device may generally be positioned aft of the first dispensing device. For example, in one embodiment, the second dispensing device may be positioned aft of the first dispensing device and forward of the cultivator. In such an embodiment, the second dispensing device may be configured to dispense the second agricultural product into the field forward of the cultivator such that the cultivator incorporates the second agricultural product into the soil. In another embodiment, the second dispensing device may be positioned aft of the first dispensing device and the cultivator. In such an embodiment, the second dispensing device may be configured to dispense the second agricultural product into the lateral swath of the soil that has been agitated by the cultivator.

Referring now to the drawings, FIG. 1 illustrates a perspective view of one embodiment of an agricultural implement 10 in accordance with aspects of the present subject matter. As shown, in the illustrated embodiment, the agricultural implement 10 is configured as a seed-planting implement and, more specifically, a seeder (e.g., a disc drill). As such, the agricultural implement 10 may be configured to be towed across a field in a direction of travel (e.g., as indicated by arrow 12 in FIG. 1) by an agricultural tractor or other suitable work vehicle (not shown). However, it should be appreciated that, in alternative embodiments, the agricultural implement 10 may generally correspond to any suitable equipment or implement, such as planter or another seed-dispensing implement, a side dresser or another fertilizer-dispensing implement, a strip tiller, and/or the like.

As shown in FIG. 1, the agricultural implement 10 may include a toolbar 14 configured to support and/or couple to one or more components of the implement 10. Specifically, in several embodiments, the toolbar 14 may extend along a lateral direction (e.g., as indicated by arrow 14 in FIG. 1) between a first side 16 of the agricultural implement 10 and a second side 18 of the agricultural implement 10. As shown, the toolbar 14 may include a center section 20, a first wing section 22, and a second wing section 24. In one embodiment, the wing sections 22, 24 may be pivotably coupled to the center section 20 in a manner that permits the wing sections 22, 24 to fold forward to reduce the lateral width of the agricultural implement 10, such as during storage or transportation of the implement 10 on a road. Furthermore, a tow bar 26 may be coupled to the center section 20 to allow the agricultural implement 10 to be towed by the work vehicle in the direction of travel 12.

Additionally, as shown in FIG. 1, the wing sections 22, 24 and the center section 20 may generally be configured to support a plurality of row units (or seed-planting units) 100. As will be described below, each row unit 100 may be configured to selectively dispense first and second types of agricultural products, such as cash crop seeds (e.g., corn seeds, soybean seeds, and/or the like) and cover crop seeds (e.g., grass seeds, *brassica* seeds, legume seeds, and/or the like), in the field as the agricultural implement 10 is moved across the field. In some embodiments, the bulk of the agricultural products to be dispensed may be stored in one or more hoppers or tanks 28 mounted on or otherwise supported by the toolbar 14. Thus, as agricultural products are dispensed by the row units 100, a pneumatic distribution system (not shown) may distribute additional agricultural products from the hopper(s) 28 to the individual row units 100. Additionally, one or more fluid tanks 30 mounted on or otherwise supported by the toolbar 14 may store agricultural fluids, such as insecticides, herbicides, fungicides, fertilizers, and/or the like, which may be sprayed onto the seeds during planting.

It should be appreciated that, for purposes of illustration, only a portion of the row units 100 of the agricultural implement 10 have been shown in FIG. 1. In general, the agricultural implement 10 may include any number of row units 100, such as six, eight, twelve, sixteen, twenty-four, thirty-two, or thirty-six row units 100. In addition, it should be appreciated that the lateral spacing between row units 100 may be selected based on the type of crop being planted. For example, the row units 100 may be spaced approximately thirty inches from one another for planting corn, and approximately fifteen inches from one another for planting soybeans.

It should be further appreciated that the configuration of the agricultural implement 10 described above and shown in FIG. 1 is provided only to place the present subject matter in an exemplary field of use. Thus, it should be appreciated that the present subject matter may be readily adaptable to any manner of implement configuration.

Figure 2:
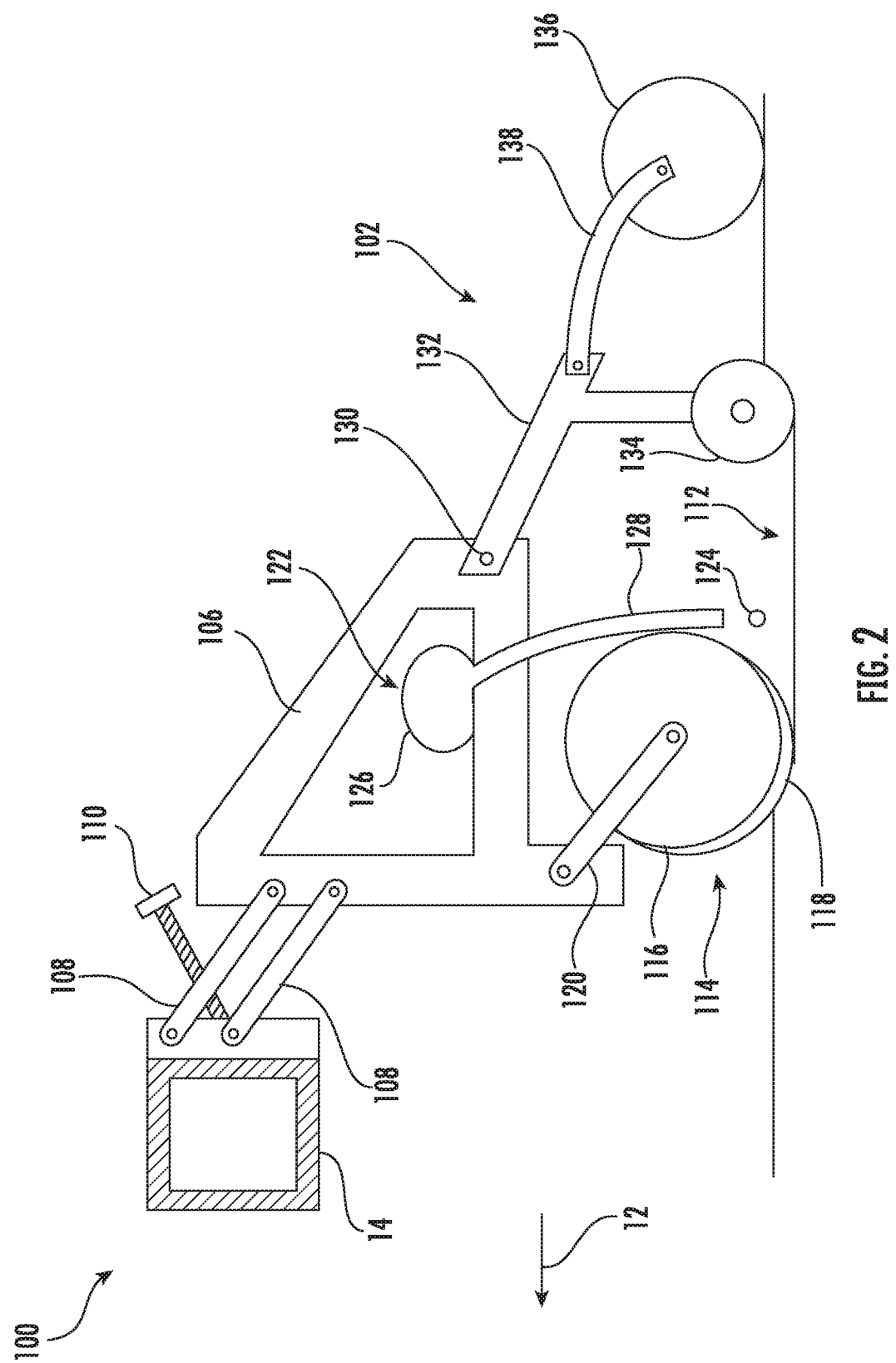
FIG. 2 illustrates a side view of one embodiment of a row unit of an agricultural implement in accordance with aspects of the present subject matter, particularly illustrating the row unit having a removable furrow-closing assembly mounted thereon.
Figure 3:
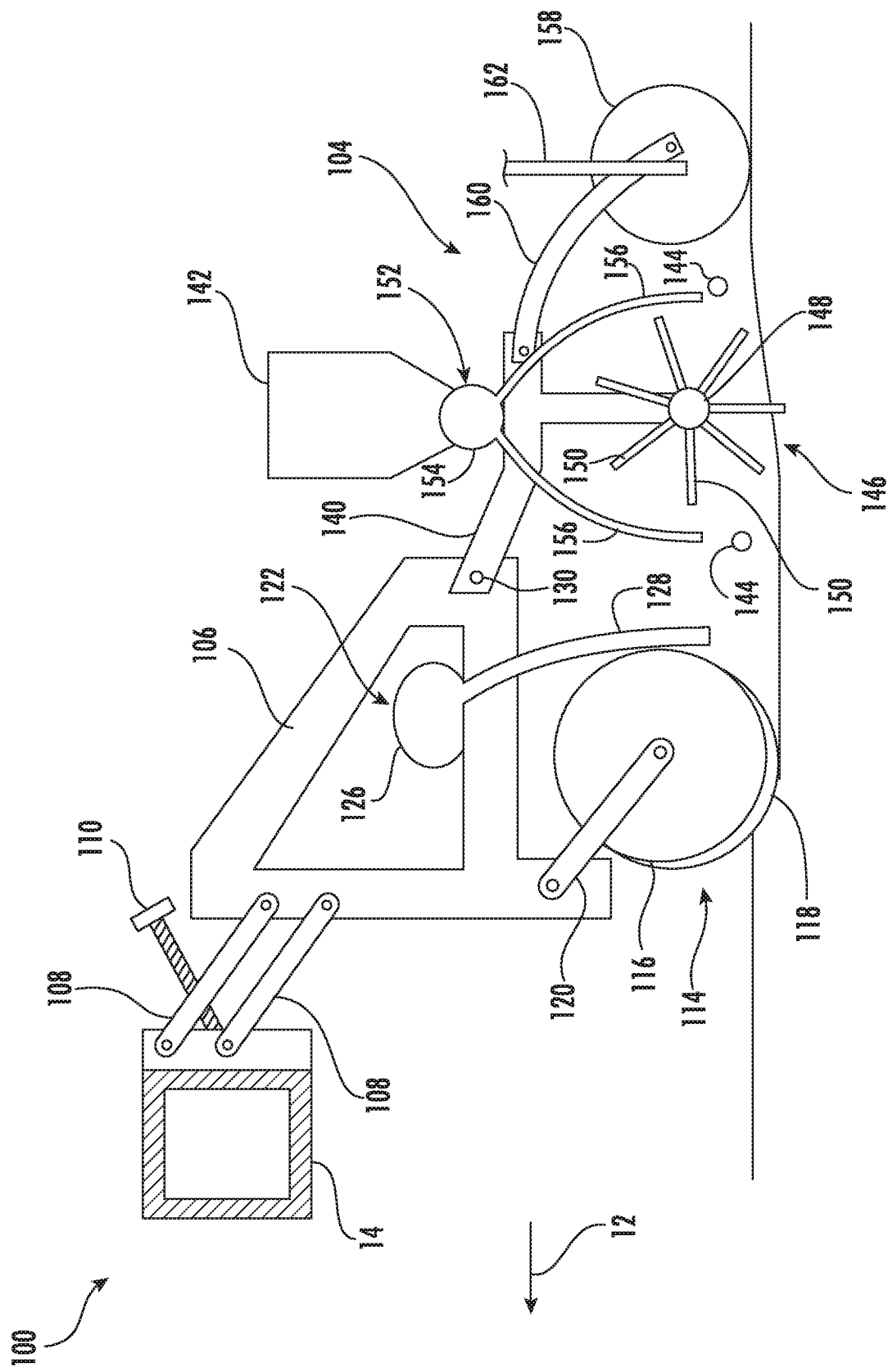
FIG. 3 illustrates a side view of the embodiment of a row unit shown in FIG. 2, particularly illustrating the row unit having a removable cover crop seeding assembly mounted thereon in place of the removable furrow-closing assembly.

Referring now to FIGS. 2 and 3, side views of one embodiment of a row unit 100 of an agricultural implement are illustrated in accordance with aspects of the present subject matter. Specifically, FIG. 2 illustrates the row unit 100 including a furrow-closing assembly 102 removably mounted thereon. Additionally, FIG. 3 illustrates the row unit 100 including a cover crop seeding assembly 104 mounted thereon in place of the furrow-closing assembly 102.

As shown in FIGS. 2 and 3, the row unit 100 may include a frame 106 adjustably coupled to the toolbar 14 by links 108. For example, one end of each link 108 may be pivotably coupled to the frame 106, while an opposed end of each link 108 may be pivotably coupled to the toolbar 14. Furthermore, an adjustment mechanism 110 configured to adjust the position of the row unit 100 relative to the toolbar 14. For example, the adjustment mechanism 40 may be configured to move the row unit 100 between an operational position in which the row unit 100 is positioned such that a furrow 112 is formed in the soil and a non-operational position in which the row unit 100 is lifted out of the soil (e.g., during storage, headland maneuvers, and/or transportation to and from the field). In the illustrated embodiment, the adjustment mechanism 110 corresponds to a screw. However, it should be appreciated that, in alternative embodiments, the adjustment mechanism 110 may correspond to any other suitable device(s), such as a fluid-driven actuator, electric linear actuator, and/or the like. Furthermore, it should be appreciated that, in other embodiments, the row unit 100 may be coupled to the toolbar 14 in any other suitable manner.

In several embodiments, the row unit 100 may include a furrow-opening assembly 114. For example, in one embodiment, the furrow-opening assembly 114 may include a gauge wheel 116 and one or more disc openers 118 configured to excavate a furrow or trench in the soil. In general, the gauge wheel 116 may be configured to engage the top surface of the soil as the agricultural implement 10 is moved across the field. As such, the height of the disc opener(s) 118 may adjusted with respect to the position of the gauge wheel 116 to set the desired depth of the furrow being excavated. Furthermore, the furrow-opening assembly 114 may include a support arm 120 configured to adjustably couple the gauge wheel 116 to the frame 106. For example, one end of the support arm 120 may be pivotably coupled to the gauge wheel 116, while an opposed end of the support arm 120 may be pivotably coupled to the frame 106. Moreover, the disc opener(s) 118 may be coupled (e.g., bolted) to the frame 106. However, it should be appreciated that, in alternative embodiments, the gauge wheel 116 and the disc opener(s) 118 may be coupled to the frame 106 in any other suitable manner. Additionally, it should be appreciated that, in further embodiments, the furrow-opening assembly 114 may include any other suitable type of furrow-forming tool(s), such as a hoe opener(s).

Furthermore, in several embodiments, the row unit 100 may include a primary or cash crop seed-dispensing device 122. For example, in one embodiment, the cash crop seed-dispensing device 122 may be configured to receive a cash crop seeds 124 (e.g., corn seeds, soybean scenes, and/or the like), e.g., from the tank(s) 28, and deposit or otherwise dispense the received seeds 124 into the furrow 112 being formed by the furrow-forming assembly 114. However, in alternative embodiments, the cash crop seed-dispensing device 122 may be configured to dispense any other suitable type of seeds or other agricultural products (e.g., fertilizer) as the implement 10 is moved across the field.

It should be appreciated that the cash crop seed-dispensing device 122 may correspond to any suitable device(s) configured to dispense cash crop seeds or other agricultural products as the implement 10 is moved across the field. For example, in one embodiment, the cash crop seed-dispensing device 122 may include a seed meter 126 and an associated seed tube 128. As shown, the seed meter 126 may be configured to uniformly release the cash crop seeds 124 received from the hopper(s) 28 for deposit within the furrow 112. In this regard, the seed meter 126 may be mounted on or otherwise coupled to the frame 106 at a location generally positioned above the furrow-opening assembly 114. Moreover, the seed meter 126 may be coupled to a suitable vacuum source (not shown), such as a blower powered by a motor and associated tubing or hoses, that is configured to generate a vacuum or negative pressure. The may, in turn cause the cash crop seeds 124 to attach to a rotating seed disc (not shown) of the seed meter 126, which controls the rate at which the seeds 124 are output from the seed meter 126 into the seed tube 128. The seed tube 128 may, in turn extend vertically between the seed meter 126 and the ground to facilitate delivery of the cash crop seeds 124 output from the seed meter 126 to the furrow 112. However, it should be appreciated that, in alternative embodiments, the cash crop seed-dispensing device 122 may correspond to any other suitable device(s) and/or have any other suitable configuration.

Referring particularly to FIG. 2, the row unit 100 may include a furrow-closing assembly 102. In general, the furrow-closing assembly 102 may be configured to collapse or otherwise close the furrow 112 after the cash crop seeds 124 have been deposited therein. As such, in several embodiments, the furrow-closing assembly 102 may be removably coupled to the frame 106 at a location aft of the furrow-opening assembly 114 and the cash crop seed-dispensing device 122. For example, in one embodiment, the furrow-closing assembly 102 may be removably coupled to the frame via a suitable fastener(s), such as a mounting bolt 130. In this regard, when the furrow-closing assembly 102 is coupled to the row unit 100, the row unit 100 may be configured to plant the cash crop seeds 124 in the field. However, as will be described below, the furrow-closing assembly 102 may be detached or otherwise removed from the frame 106 and a cover crop seeding assembly 104 may be coupled to the frame 106 in place of the assembly 102, thereby configuring the row unit 100 to plant cover crop seeds within the field. It should be appreciated that, in alternative embodiments, the furrow-closing assembly 102 may be removably coupled to the frame 106 of the row unit 100 in any other suitable manner.

As shown in FIG. 2, the furrow-closing assembly 102 may include any suitable component(s) configured to close the furrow (e.g., the furrow 112) formed by the furrow-opening assembly 114. Specifically, in several embodiments, the furrow-closing assembly 102 may include a closing arm 132 that is removably coupled to the frame 106 (e.g., via the mounting bolt 130). The closing arm 132 may, in turn, be configured to support or otherwise be coupled to one or more ground-engaging tools of the furrow-closing assembly 102. For example, in one embodiment, a pair of closing discs 134 (only one is shown in FIG. 2) may be rotatably coupled to the closing arm 132 and positioned relative to each other in a manner that permits soil to flow between the discs 134 as the agricultural implement 10 is moved across the field. As such, the closing discs 134 may be configured to penetrate the soil in a manner that collapses the furrow 112, thereby closing the furrow 112 after the seeds 124 have been deposited therein. However, it should be appreciated that, in alternative embodiments, the furrow-closing assembly 102 may include any other suitable number of closing discs 134, such as one closing disc 134 or three or more closing discs 134. Additionally, it should be appreciated that, in further embodiments, the furrow-closing assembly 102 may have any other suitable configuration. For example, in one alternative embodiment, the furrow-closing assembly 102 may include a pair of closing wheels (not shown), such as pinch wheels, in lieu of the closing discs 134.

Furthermore, the furrow-closing assembly 102 may also include a press wheel 136. In general, the press wheel 136 may be configured to roll over the closed furrow to firm the soil over the cover crop seeds and promote favorable seed-to-soil contact. As such, the press wheel 136 may be coupled to the closing arm 132 aft of the closing discs 134. Specifically, in one embodiment, the press wheel 136 may be coupled to the closing arm 132 by a press wheel arm 138. For example, one end of press wheel arm 138 may be pivotably coupled to the press wheel 136, while an opposed end of the press wheel arm 138 may be pivotably coupled to the closing arm 132. However, it should be appreciated that, in alternative embodiments, the press wheel 136 may be coupled to the frame 106 of the row unit 100 in any other suitable manner. Moreover, it should be appreciated that some embodiments of the furrow-closing assembly 102 may not include the press wheel 138.

Referring now to FIG. 3, the row unit 100 may include the cover crop seeding assembly 104. More specifically, as mentioned above, the row unit 100 may be configured to plant the cash crop seeds 124 in the field when the furrow-closing assembly 102 is coupled to or otherwise mounted on the frame 106. However, the furrow-closing assembly 102 may be removed from the row unit 100, such as by removing the mounting bolt 130. Thereafter, the cover crop seeding assembly 104 may be removably coupled to the frame 106 in place of the furrow-closing assembly 102, e.g., via the mounting bolt 130. In this regard, and as will be described below, removing the furrow-closing assembly 102 and coupling the cover crop seeding assembly 104 may configure the row unit 100 to dispense cover crop seeds (instead of the cash crop seeds 124) as the agricultural implement 10 is moved across the field. As such, farmers may be able to use a single agricultural implement (e.g., the agricultural implement 10) to plant both cash crop seeds and cover crop seeds within the field, thereby reducing the overall cost of adopting cover cropping practices.

As shown in FIG. 3, the cover crop seeding assembly 104 may include a subframe 140 that is configured to be removably coupled to the frame 106 (e.g., via the mounting bolt 130) in place of the closing arm 132. The subframe 140 may, in turn, be configured to support or otherwise be coupled to one or more components of the cover crop seeding assembly 104. For example, in several embodiments, the subframe 140 may support a cover crop seed hopper or tank 142 configured to store cover crop seeds 144 to be dispensed as the agricultural implement 10 is moved across the field. In one embodiment, the cover crop seed hopper 142 may be configured to receive bulk cover crop seeds from the central cash crop seed tank(s)/hopper(s) (e.g., the tanks 28) via the same pneumatic distribution system (not shown) used to convey the bulk cash crop seeds from such tank(s) to a cash crop seed hopper (not shown) mounted on the row unit 100. However, in alternative embodiments, the cover crop seed hopper 142 may be positioned at any other suitable location on the agricultural implement 10, such as on the toolbar 14 of the agricultural implement 10.

In accordance with aspects of the present subject matter, the cover crop seeding assembly 104 may include the cultivator 146. In general, the cultivator 146 may be configured to lightly till, disturb, or otherwise agitate a lateral swath of the soil within the field as the agricultural implement 10 is moved across the field. Specifically, in several embodiments, the cultivator 146 may be rotatably coupled to the subframe 140 such that the cultivator 146 is positioned aft of furrow-opening assembly 114 and the cash crop seed-dispensing device 122. For example, in one embodiment, the cultivator 146 may include one or more cultivator wheels 148, with each wheel 148 having a plurality of ground-engaging tines or fingers 150 positioned circumferentially around the wheel 148. In this regard, as the agricultural implement 10 is moved across the field, the cultivator 142 may be configured to rotate relative to the ground. As such, when a force is applied to the cultivator (e.g., from the weight of the cover crop seeding assembly 104 or a suitable actuator, such as a fluid-driven cylinder), the ground-engaging tines 150 may penetrate the soil as the cultivator 142 rotates, thereby agitating the soil within the lateral swath of the field over which the cultivator 142 is being moved. In one embodiment, the penetration depth of the ground-engaging tines 150 may be less than the depth the furrow 112 formed by the furrow-opening assembly 114. In this regard, the ground-engaging tines 150 may not disturb any cash crop seeds 124 that have already been planted in the field. However, it should be appreciated that, in alternative embodiments, the cultivator 142 may have any other suitable configuration that allows the cultivator 142 to agitate a lateral swath of the soil as the agricultural implement 10 is moved across the field.

Furthermore, in several embodiments, the row unit 100 may include a cover crop seed-dispensing device 152. For example, in one embodiment, the cover crop seed-dispensing device 152 may be configured to receive the cover crop seeds 144 (e.g., grass seeds, *brassica* seeds, legume seeds, and/or the like) from the cover crop seed hopper 142 and deposit or otherwise dispense the received seeds 144 into the field. However, in alternative embodiments, the cover crop seed-dispensing device 152 may be configured to dispense any other suitable type of seeds or other agricultural products (e.g., fertilizer) as the agricultural implement 10 is moved across the field.

It should be appreciated that the cover crop seed-dispensing device 152 may correspond to any suitable device(s) configured to dispense seeds or other agricultural products as the implement 10 is moved across the field. For example, in one embodiment, the cover crop seed-dispensing device 152 may include a metering device 154 and an associated seed tube 156. As such, the metering device 154 may be configured to uniformly release the cover crop seeds 144 received from the tank 142 for dispensing within the field. In this regard, the metering device 154 may be mounted on or otherwise coupled to the frame 106 at a location generally positioned below the cover crop seed tank 142 and above the cultivator 146. Moreover, the metering device 154 may include a gravity-fed fluted roller (not shown) that may be driven by a mechanical ground wheel (not shown) or in electric motor (not shown) to control the rate at which the cover crop seed 144 is output from the cover crop seed hopper 142 into the seed tube 156.

The seed tube 156 may, in turn, extend vertically between the metering device 154 and the ground to facilitate delivery of the cover crop seeds 144 output from the metering device 154 to the soil. In one embodiment, the seed tube 156 may be configured to dispense the cover crop seeds 144 onto a portion of the field positioned forward of the cultivator 146. In such an embodiment, the cultivator 146 may be configured to incorporate the cover crop seeds 144 into the soil as the cultivator 146 rotate to agitate the soil within the traversed lateral swath the field. In another embodiment, the seed tube 156 may be configured to dispense the cover crop seeds 144 onto a portion of the field positioned aft of the cultivator 146. In such an embodiment, the cover crop seeds 144 may be dispensed onto the agitated (e.g., lightly tilled) soil. Although two seed tubes 156 are shown in FIG. 3 for the purposes of illustration, it should be appreciated that the cover crop seed-dispensing device 156 may generally include any suitable number of the seed tubes 156 such as only a single seed tube 156 or there or more seed tubes 156. Additionally, it should be appreciated that, in other embodiments, the cover crop seed-dispensing device 152 may correspond to any other suitable device(s) and/or have any other suitable configuration.

Furthermore, the cover crop seeding assembly 104 may also include a press wheel 158. In general, the press wheel 158 may be configured to roll over the agitated soil to firm the soil in/on which the cover crop seeds 144 have been dispensed to promote favorable seed-to-soil contact. As such, the press wheel 158 may be coupled to the subframe 140 aft of the cultivator 146. Specifically, in one embodiment, the press wheel 158 may be coupled to the subframe 140 by a press wheel arm 160. For example, one end of press wheel arm 160 may be pivotably coupled to the press wheel 158, while an opposed end of the press wheel arm 160 may be pivotably coupled to the subframe 140. However, it should be appreciated that, in alternative embodiments, the press wheel 158 may be coupled to the frame 106 of the row unit 100 in any other suitable manner. Moreover, it should be appreciated that some embodiments of the cover crop seeding assembly 104 may not include the press wheel 158.

In addition, the cover crop seeding assembly 104 may include one or more fertilizer applicators 162. In general, the fertilizer applicator 162 may be configured to dispense or otherwise deposit a fertilizer (e.g., a liquid or granular fertilizer) as the agricultural implement 10 is moved across the field. In several embodiments, the fertilizer applicator(s) 162 may be positioned aft of the cultivator 146 and the cover crop seed-dispensing device 152. Specifically, in one embodiment, the fertilizer applicator(s) 162 may generally be aligned with the press wheel 158 along the direction of travel 12 of the seed-planning implement 10. Moreover, the fertilizer applicator(s) 162 may be spaced apart from the furrow-opening assembly 114 (e.g., the furrow-forming tool(s)) and the press wheel 158 in the lateral direction 14. Furthermore, the fertilizer applicator(s) 132 may correspond to any suitable device(s) configured to dispense the fertilizer into the field. For example, in one embodiment, the fertilizer applicator(s) 162 may be configured as a suitable tube(s) configured to drop or otherwise dispense the fertilizer into field. However, it should be appreciated that, in alternative embodiments, the fertilizer applicator(s) 162 may be configured as any other suitable type of device(s). For example, in one alternative embodiment, the fertilizer applicator(s) 162 may be configured as a suitable sprayer(s) or nozzle(s) (not shown). Additionally, the fertilizer applicator(s) 162 may be configured to receive fertilizer from the same central fertilizer system (e.g., the tank 30 and the associated pneumatic distribution system (not shown)) used in fertilizing the cash crop or a dedicated fertilizer hopper (not shown) mounted on the row unit 100.

It should be appreciated that, although the row unit 100 is described above in the context of being configured to dispense cash crop seeds when the furrow-closing assembly 102 is coupled to the frame 106 and cover crop seeds when the cover crop seeding assembly 104 is coupled to the frame 106, it should be appreciated that the row unit may be configured to dispense any other suitable types of agricultural products. For example, the row unit 100 may be configured to dispense two different types of cash crop seeds, two different types of cover crop seeds, a seed and a fertilizer, and/or any other suitable agricultural products or combinations of agricultural products.

Furthermore, it should be appreciated that, in several embodiments, the agricultural implement 10 may include at least one row unit 100 that includes the furrow-closing assembly 102 and at least one other row unit 100 that includes the cover crop seeding assembly 104. For example, in one embodiment, the agricultural implement 10 may include a plurality of row units 100 spaced apart from each other along the lateral direction, with the row units 100 alternatingly including one of the furrow-closing assembly 102 or the cover crop seeding assembly 104. In such an embodiment, the agricultural implement 10 may be configured to simultaneously plant a cash crop (e.g., in rows) and a cover crop (e.g., in between the rows of the cash crop). However, in alternative embodiments, the plurality of row units 100 of the agricultural implement 10 may include any other suitable combination of furrow-closing assemblies 102 and cover crop seeding assemblies 104.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A row unit for use on an agricultural implement, the row unit comprising:
   a frame;
   a furrow-forming tool coupled to the frame, the furrow-forming tool configured to form a furrow in soil present within the field as the row unit is moved across the field;
   a first dispensing device configured to dispense a first agricultural product into the furrow;
   a cultivator coupled to the frame and positioned aft of the furrow-forming tool relative to a direction of travel of the row unit, the cultivator including a wheel and a plurality of ground-engaging tines extending linearly radially outward from the wheel such that the plurality of tines penetrates into the soil to agitate a lateral swath of the soil; and
   a second dispensing device positioned aft of the first dispensing device relative to the direction of travel, the second dispensing device including a first tube configured to dispense a second agricultural product into the field forward of the cultivator relative to the direction of travel and a second tube configured to dispense the second agricultural product into the field aft of the cultivator relative to the direction of travel.

2. The row unit of claim 1, wherein a depth of the furrow is greater than a penetration depth of the plurality of ground-engaging tines.

3. The row unit of claim 1, further comprising:
   a press wheel coupled to the frame and positioned aft of the cultivator relative to the direction of travel.

4. The row unit of claim 3, further comprising:
   a subframe removably coupled to the frame, wherein the cultivator and the press wheel are coupled to the subframe.

5. The row unit of claim 4, further comprising:
   a tank supported on the subframe, the tank configured to store the second agricultural product before delivery to the second dispensing device, wherein the second dispensing device comprises a metering device supported on the subframe, the metering device configured to control a rate at which the second agricultural product is delivered to the second dispensing device.

6. The row unit of claim 1, further comprising:
   a fertilizer applicator positioned aft of the cultivator relative to the direction of travel and spaced apart from the furrow-forming tool in a lateral direction extending perpendicular to the direction of travel.

7. An agricultural implement, comprising:

a toolbar extending in a lateral direction between a first side and a second side; and a plurality of row units mounted on the toolbar, the plurality of row units spaced apart from each other row unit in the lateral direction, wherein a first row unit of the plurality of row units comprises:

a frame;

a furrow-forming tool coupled to the frame, the furrow-forming tool configured to form a furrow in soil present within the field as the agricultural implement is moved across the field;

a first dispensing device configured to dispense a first agricultural product into the furrow;

a cultivator coupled to the frame and positioned aft of the furrow-forming tool relative to a direction of travel of the agricultural implement, the cultivator including a wheel and a plurality of ground-engaging tines extending linearly radially, outward from the wheel such that the plurality of tines penetrates into the soil to agitate a lateral swath of the soil; and a second dispensing device positioned aft of the first dispensing device relative to the direction of travel, the second dispensing device including a first tube configured to dispense a second agricultural product into the field forward of the cultivator relative to the direction of travel and a second tube configured to dispense the second agricultural product into the field aft of the cultivator relative to the direction of travel.

8. The agricultural implement of claim 7, wherein a second row unit of the plurality of row units comprises:

a frame;

a furrow-forming tool coupled to the frame, the furrow-forming tool configured to form a furrow in soil within the field as the agricultural implement is moved across the field;

a seed-dispensing device configured to dispense the first agricultural product into the furrow; and at least one furrow-closing tool configured to close the furrow.

9. The agricultural implement of claim 7, wherein a depth of the furrow is greater than a penetration depth of the plurality of ground-engaging tines.

10. The agricultural implement of claim 7, wherein the first row unit further comprises:

a press wheel coupled to the frame and positioned aft of the cultivator relative to the direction of travel.

11. The agricultural implement of claim 10, wherein the first row unit further comprises:

a subframe coupled to the frame, and the cultivator and the press wheel are coupled to the subframe.

12. The agricultural implement of claim 11, wherein the first row unit further comprises:

a tank supported on the subframe, the tank configured to store the second agricultural product before delivery to the second dispensing device, wherein the second dispensing device comprises a metering device supported on the subframe, the metering device configured to control a rate at which the second agricultural product is delivered to the second dispensing device.

13. The agricultural implement of claim 7, wherein the first row unit further comprises:

a fertilizer applicator positioned aft of the cultivator relative to the direction of travel, the fertilizer applicator being further spaced apart from the furrow-forming tool in a lateral direction extending perpendicular to the direction of travel.

* * * * *